United States Patent [19]

Patriquin

[11] Patent Number: 5,075,631

[45] Date of Patent: Dec. 24, 1991

[54] ENCODING SYSTEM AND METHOD FOR DIFFERENTIAL CAPACITIVE TRANSDUCER

[76] Inventor: Douglas R. Patriquin, 12 Elm St., Middlebury, Vt. 05753

[21] Appl. No.: 480,708

[22] Filed: Feb. 15, 1990

Related U.S. Application Data

[63] Continuation-in-part of Ser. No. 454,678, Dec. 21, 1989.

[51] Int. Cl.$^5$ .......................................... G01R 27/26
[52] U.S. Cl. ..................... 324/660; 73/304 C; 324/608; 324/671; 324/676; 324/697; 340/870.37
[58] Field of Search ............. 324/660, 677, 678, 676, 324/658, 663, 671, 607, 608, 697; 340/870.37; 73/304 C; 341/15

[56] References Cited

U.S. PATENT DOCUMENTS

| | | | |
|---|---|---|---|
| 3,668,523 | 6/1972 | Kuhn | 324/676 X |
| 3,906,471 | 9/1975 | Shawhan | 340/870.37 |
| 4,301,858 | 11/1981 | Mock | 340/870.37 X |
| 4,418,569 | 12/1983 | Kuhnel | 324/679 X |
| 4,584,885 | 4/1986 | Cadwell | 340/870.37 X |
| 4,636,792 | 1/1987 | Watson | 340/870.37 |
| 4,820,973 | 4/1989 | Alvarez | 324/678 X |

*Primary Examiner*—Kenneth A. Wieder
*Assistant Examiner*—Robert W. Mueller

[57] ABSTRACT

A transducer system and method of use thereof by sequentially operating a comparator to produce a series of pulses in which the time distribution of the pulses is representative of the transducer value, and is used to normalize the sensed value in the event that the total transducer value varies due to environmental influences. The transducer is adapted to monitor the substantially linear movement of the level (fuel-air interface) of fuel in a tank and the angular position of an input shaft.

21 Claims, 6 Drawing Sheets

ENCODING SYSTEM AND METHOD FOR DIFFERENTIAL CAPACITIVE TRANSDUCER

This is a continuation-in-part of U.S. patent application Ser. No. 07/454,678, filed Dec. 21, 1989.

The invention relates to measurements made by monitoring systems and methods, and the elimination of errors in measurement caused by environmental influences. In particular, the invention relates to error elimination in linear and/or rotary motion monitoring systems and methods.

In a preferred embodiment the invention provides an electronic system and method which uses a differential capacitive transducer, in an optically powered sensor system. The differential capacitive transducer, may be a rotary or a linear position transducer, and useful for fuel gauging or shaft position measurement.

BACKGROUND OF THE INVENTION

Patriquin in U.S. Pat. No. 4,820,916 discloses an optically powered sensor system. Oota et al. in U.S. Pat. No. 4,601,201 discloses an apparatus for measuring the level of a fluid utilizing a capacitive probe having capacitor plates driven by a high-frequency signal, Col. 2, lines 20-30 and Col. 5, lines 13-31. Kuhnel in U.S. Pat. No. 4,418,569 discloses a capacitive fluid level sensor that utilizes difference amplifiers. Decker in U.S. Pat. No. 4,373,389 relates to capacitive level measurement in which sum and difference values are determined, Col. 1, lines 60-68 and Col. 2, lines 1-5 and 15-22. Gray et al. in U.S. Pat. No. 4,517,547 discloses a water-in-fuel sensor and method, Col. 3, lines 6-60.

An electronic encoding method is provided for the conversion of a differential capacitive transducer value into timing pulses suitable for transmission over a fiber-optic sensor system network. A reference signal provides for normalization of the sensor value in the event that the total transducer value varies due to environmental influences.

BRIEF DESCRIPTION OF THE INVENTION

A transducer system and method of use thereof by sequentially operating a comparator to produce a series of pulses in which the time distribution of the pulses is representative of the transducer value, and is used to normalize the sensed value in the event that the total transducer value varies due to environmental influences. The transducer is adapted to monitor the substantially linear movement of the level (fuel-air interface) of fuel in a tank and the angular position of an input shaft.

DETAILED DESCRIPTION OF THE INVENTION

Figure 1:
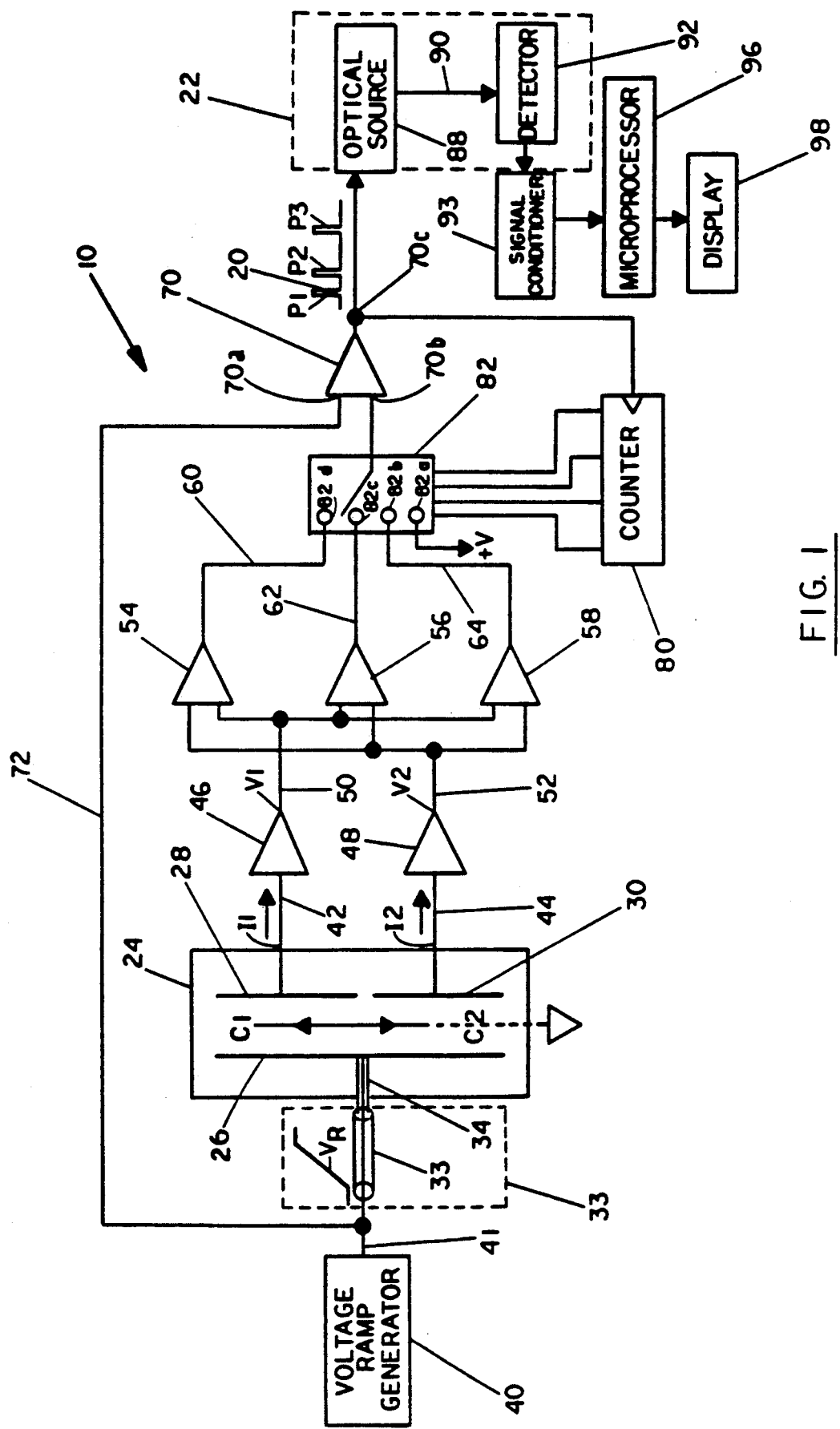
FIG. 1 shows a schematic representation of an encoder system for a rotating shaft in accordance with the invention.

The invention is now described with more particular reference to FIGS. 1-6. FIG. 1 shows an electronic encoder system 10. Encoder system 10 converts a differential capacitive transducer value into timing pulses 20 which are suitable for conversion into optical pulses and transmission over an optical network 22. A differential capacitor transducer 24, having a readily rotatable common plate 26, and first and second differential plates 28 and 30 respectively, is utilized as a sensing transducer. The angular position of the input shaft 33 and transducer connector 34 of the capacitive transducer 24 provides signal values $C_1$ and $C_2$. Shaft 33 is housed within an engine 33'.

To determine the angular position of an input shaft 33, a voltage ramp having waveform $V_R$ is generated by voltage ramp generator 40. The waveform $V_R$ includes a linear portion having a substantially constant change in voltage per unit time. Voltage ramp generator 40 applies a voltage ramp $V_R$ through line 41 to the common plate 26 which produces currents $I_1$ and $I_2$, in lines 42 and 44 respectively, that are converted to voltages $V_1$ and $V_2$, in transimpedance amplifiers 46 and 48 respectively. Voltages $V_1$ and $V_2$, in lines 50 and 52, are provided to voltage amplifiers 54, 56 and 58 to produce respective voltages $V_{-sum}$, $V_{diff}$ and $V_{sum}$, in lines 60, 62 and 64 respectively. Voltage $V_{-sum}$ is proportional to the negated sum: $-(V_1+V_2)$. Voltage $V_{diff}$ is proportional to the difference: $(V_1-V_2)$. Voltage $V_{sum}$ is proportional to the sum: $(V_1+V_2)$. A comparator 70 is driven by the input voltage ramp generator 40 through line 72, and sequentially compares the voltages $V_{-sum}$, $V_{diff}$, and $V_{sum}$ with voltage ramp input from the voltage ramp generator 40. A series of three output pulses $P_1$, $P_2$ and $P_3$ are generated by comparator 70. The timing of the intermediate pulse $P_2$ relative to the preceding first pulse $P_1$ and the succeeding third pulse $P_3$ presents the desired transducer value. This value is representative of the angular position of shaft 33. Pulses $P_1$, $P_2$ and $P_3$ are then converted to light and transmitted over an optical network 22. The encoding system 10 normalizes the sensed value in the event that the total transducer value varies due to environmental influences. Thus, the system 10 produces a series of pulses in which the relationship of the intermediate pulse with its preceding and succeeding pulse, is representative of the transducer value, and used to normalize the sensed value in the event that the total transducer value varies due to environmental influences.

The position of common plate 26, which is moved by shaft 33, determines the values of $C_1$ and $C_2$. The sum of $C_1$ and $C_2$ is constant in theory but may change due to environmental variations. The construction of the transducer 24 is a moving plate 26 with an angular range of 180° and a linear range of less than 180°.

A voltage ramp having waveform $V_R$ is applied to the common plate 26, which charges differential plates 28 and 30 to produce current flows $I_1$ and $I_2$ through lines 42 and 44 respectively from the differential capacitor transducer 24. These currents ($I_1$ and $I_2$) are proportional to $C_1$ and $C_2$ respectively. Currents $I_1$ and $I_2$ are converted to voltages by transimpedance amplifiers 46 and 48 to produce voltages $V_1$ and $V_2$ which are proportional to $C_1$ and $C_2$ respectively. Voltages $V_{-sum}$, $V_{diff}$ and $V_{sum}$ are produced by voltage amplifiers 54, 56 and 58 respectively. As discussed above voltages $V_{-sum}$, $V_{diff}$ and $V_{sum}$ are proportional to the algebraic negated sum $[-(V_1+V_2)]$, difference $[V_1-V_2]$ and sum $[V_1+V_2]$ respectively of voltages $V_1$ and $V_2$.

Input 70a of comparator 70 is driven through line 72 by the voltage ramp which also drives the common plate 26 of the transducer 24. A counter 80 is reset to one at the beginning of each encoding cycle, and sequentially connects voltages $V_{-sum}$, $V_{diff}$ and $V_{sum}$ through switches 82b, 82c and 82d respectively to input 70b of comparator 70 using switch unit 82. Each comparator input voltage $V_{-sum}$, $V_{diff}$ and $V_{sum}$ generates a single output voltage pulse, the relative timing of which indicates the ratio of the input voltages. After the third output voltage pulse has been generated, the encoding sequence is complete. These pulses are converted to light pulses by optical source 88, and transmitted over a fiber optic cable 90 to a photodetector 92 in network 22. Photodetector 92 is connected to signal conditioner 93, which is connected to microprocessor 96. The angular position of shaft 34 is determined in microprocessor 96 and displayed by display 98.

When the voltage of the voltage ramp having waveform $V_R$ exceeds the applied input voltage $+V$ at contact 82a, the potential at output 70c of comparator 70 changes to a true state (on voltage). This change of state increments the counter 80 which activates switch 82 to connect the next input voltage at contact 82b to input 70b of comparator 70. Because the next input voltage still exceeds voltage of the ramp of waveform $V_R$ at this point in time, the potential at output 70c of the comparator 70 returns to a false (off) state. The leading edge of the output voltage pulse $P_1$ comprising the false ... true ... false (off ... on ... off) transitions of the voltage at comparator output 70c, and marks the time when the voltage of the ramp voltage $V_R$ crosses (i.e. is equal to) the input voltage $V_{-sum}$ at contact 82b.

When the voltage of ramp $V_R$ exceeds the applied input voltage $V_{-sum}$ at contact 82b, the potential at output 70c of comparator 70 changes to a true state (on voltage). This change of state increments the counter 80 which activates switch 82 to connect the next input voltage at contact 82c to input 70b of comparator 70. Because the next input voltage still exceeds voltage of the ramp $V_R$ at this point in time, the potential at output 70c of the comparator 70 returns to a false (off) state. The leading edge of the output voltage pulse $P_2$ comprising the false ... true ... false (off ... on ... off) transitions of the voltage at comparator output 70c, and marks the time when the voltage of the ramp voltage $V_R$ crosses (i.e. is equal to) the input voltage $V_{diff}$ at contact 82c.

When the voltage of ramp $V_R$ exceeds the applied input voltage $V_{diff}$ at contact 82c, the potential at output 70c of comparator 70 changes to a true state (on voltage). This change of state increments the counter 80 which activates switch 82 to connect the next input voltage at contact 82d to input 70b of comparator 70. Because the next input voltage still exceeds voltage of the ramp $V_R$ at this point in time, the potential at output 70c of the comparator 70 returns to a false (off) state. The leading edge of the output voltage pulse $P_3$ comprising the false ... true ... false (off ... on ... off) transitions of the voltage at comparator output 70c, and marks the time when the voltage of the ramp voltage $V_R$ crosses (i.e. is equal to) the input voltage $V_{sum}$ at contact 82d.

Figure 2:
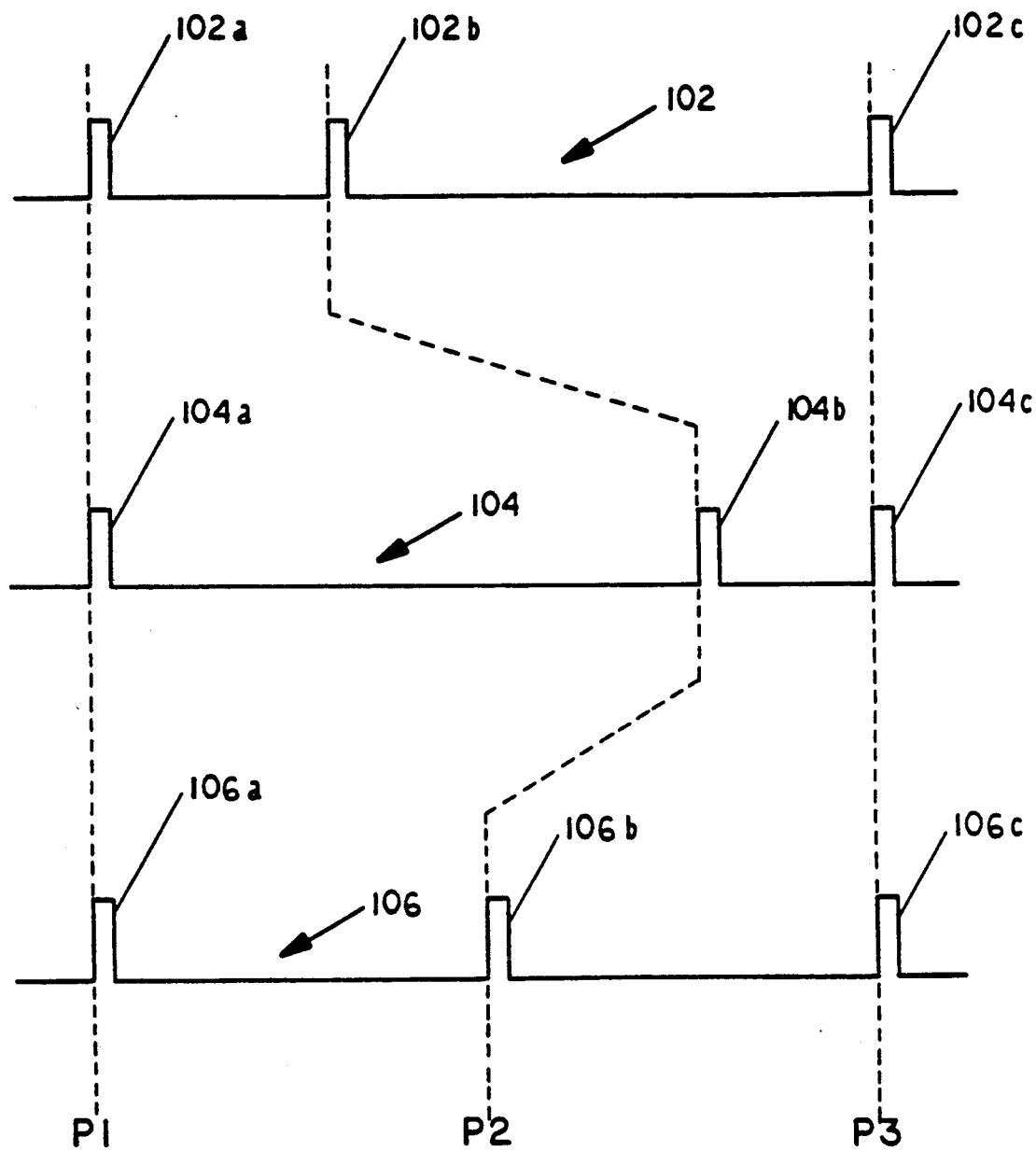
FIG. 2 shows relative positions of pulses $P_1$, $P_2$ and $P_3$ on three vertically aligned traces produced by the signal processing of transducer signals for monitoring the angular position of a shaft in accordance with the invention.

FIG. 2 shows relative positions of voltage pulses $P_1$, $P_2$ and $P_3$ on vertically aligned traces 102, 104 and 106 produced by the signal processing of transducer signals for monitoring the angular position of a shaft in accordance with the invention. Three different positions of shaft 34 are illustrated in FIG. 2 by traces 102, 104 and 106.

Trace 102 shows the position of pulses 102a, 102b and 102c ($P_1$, $P_2$ and $P_3$ respectively) when the position of common plate 26 results in the capacitance of differential plate 28 being less than the capacitance of differential plate 30. Trace 104 shows the position of pulses 104a, 104b and 104c ($P_1$, $P_2$ and $P_3$ respectively) when the position of common plate 26 results in the capacitance of differential plate 28 being greater than the capacitance of differential plate 30. Trace 106 shows the position of pulses 106a, 106b and 106c ($P_1$, $P_2$ and $P_3$ respectively) when the position of common plate 26 results in the capacitance of differential plate 28 being equal to the capacitance of differential plate 30.

The position of the pulse $P_3$ is unchanged relative to $P_1$ for any position of shaft 34. The position of pulse $P_3$ corresponds to the total capacitance (represented by $V_{sum}$) of the transducer 24 which is independent of the position of shaft 34. The position of pulse $P_2$ however, moves in time with respect to pulses $P_1$ and $P_3$, reflecting the relative angular position of the shaft 34.

Each signal from transducer is subject to variation due to environmental influences, such as changes in temperature. These variations, due to environmental influences, cause incorrect indications of the quantity monitored based upon a particular signal unless it is normalized (corrected). The distribution in time of the three pulses provides an indication of the quantity being monitored. This quantity is normalization in accordance with the present invention using the time between these pulses. For example, the rotational angle of shaft 24 is determined in the microprocessor from the pulse positions in time by Equation I as follows:

$$\text{Shaft Angle} = k \frac{2 T_{P2-P1} - T_{P3-P1}}{T_{P3-P1}} \quad (I)$$

k = Proportionality constant $T_{P2-P1}$ = Time between pulse P2 and pulse P1

$T_{P3-P1}$ = Time between pulse P3 and pulse P1

From Equation I it can be seen that the variation in the total transducer capacitance due to environmental effects will change the absolute value of the times between the pulses but not their ratios. Therefore, the sensed shaft angle indication will not be affected by environmental changes in the transducer.

Figure 3:
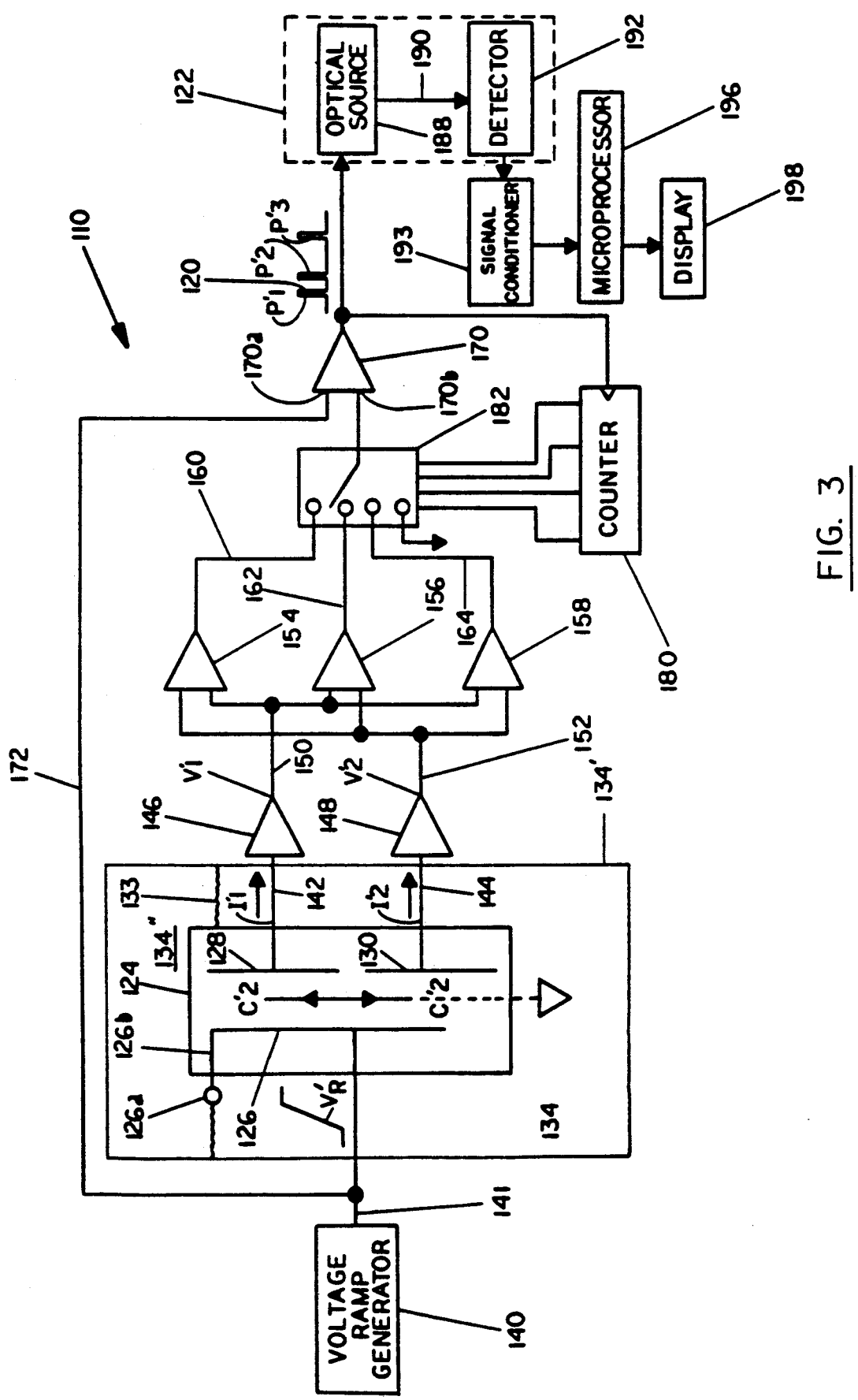
FIG. 3 shows a schematic representation of an encoder system for liquid level in a tank in accordance with the invention.

FIG. 3 shows an electronic encoder system 110 which converts a differential capacitive transducer value into timing pulses 120 which are suitable for conversion into optical pulses and transmission over an optical network 122. A differential capacitor transducer 124, having a linearly movable common plate 126, and first and second differential plates 128 and 130 respectively, is utilized as a sensing transducer. The capacitive transducer 124 provides signal values $C'_1$ and $C'_2$.

The upper surface (level) 133 forms a liquid-gas interface between gas (air) 134" and liquid fuel 134 in tank 134'. The position of upper surface 133 is readily determined and the quantity of fuel displayed by system 110. The float 126a is connected to common plate 126 by connector 126b. The float 126 is supported by liquid fuel 134 at the upper level 133. As the upper level 133 raises and lowers with the addition and removal respectively of fuel 134 from tank 124, float 126 raises and lowers common plate 126. Voltage ramp generator 140 applies a voltage ramp having waveform $V'_R$ through line 141 to the common plate 126 which produces currents $I'_1$ and $I'_2$, in lines 142 and 144 respectively, that are converted to voltages $V'_1$ and $V'_2$, in transimpedance amplifiers 146 and 148 respectively. Voltages $V'_1$ and $V'_2$, in lines 150 and 152, are provided to voltage amplifiers 154, 156 and 158 to produce respective voltages $V'_{-sum}$, $V'_{diff}$ and $V'_{sum}$, in lines 160, 162 and 164 respectively. Voltage $V'_{-sum}$ is proportional to the negated sum $-(V'_1+V'_2)$. Voltage $V_{diff}$ is proportional to the difference $(V'_1-V'_2)$. Voltage $V_{sum}$ is proportional to the sum $(V'_1+V'_2)$. A comparator 170 is driven by the input voltage ramp through line 172, and sequentially compares the voltages $V'_{-sum}$, $V'_{diff}$ and $V'_{sum}$ with input voltage ramp. A series of three output pulses $P'_1$, $P'_2$ and $P'_3$ are generated in which the timing of the intermediate pulse $P'_2$ relative to the preceding first pulse $P'_1$ and the succeeding third pulse $P'_3$ presents the desired transducer value. Pulses $P'_1$, $P'_2$ and $P'_3$ are then converted to light and transmitted over an optical network 122. The encoding system 110 normalizes the sensed value in the event that the total transducer value varies due to environmental influences. Thus, the system 110 produces a series of pulses in which the relationship of the intermediate pulse with its preceding and succeeding pulse, is representative of the transducer value, and desirably normalizes the sensed value in the event that the total transducer value varies due to environmental influences.

The upper level 133 of fuel 134 determines the values of $C'_1$ and $C'_2$. The sum of $C'_1$ and $C'_2$ is constant in theory but may change due to environmental variations. The construction of the transducer 124 is a moving common plate 126 with a linear range covering the height to be measured.

A voltage ramp having waveform $V'_R$ is applied to the common plate 126, which charges differential capacitor plates 128 and 136 to produce current flows $I'_1$ and $I'_2$ through the respective sides of the differential plates 128 and 130 to produce current flows $I'_1$ and $I'_2$ through lines 142 and 144 respectively of the transducer 124. These currents ($I'_1$ and $I'_2$) are proportional to $C'_1$ and $C'_2$ respectively. Currents $I'_1$ and $I'_2$ are converted to voltages by transimpedance amplifiers 146 and 148 to produce voltages $V'_1$ and $V'_2$ which are proportional to $C'_1$ and $C'_2$ respectively. Voltages $V'_{-sum}$, $V'_{diff}$ and $V'_{sum}$ are produced by voltage amplifiers 154, 156 and 158 respectively. Voltages $V'_{-sum}$, $V'_{diff}$ and $V'_{sum}$ are proportional to the algebraic negated sum $[-(V'_1+V'_2)]$, difference $[V'_1-V'_2]$ and sum $[V'_1+V'_2]$ of Voltages $V'_1$ and $V'_2$.

Input 170a of comparator 170 is driven through line 172 by the voltage ramp which also drives the common plate 126 of the transducer 124. A counter 180 is reset to one at the beginning of each encoding cycle, and sequentially connects voltages $V'_{-sum}$, $V'_{diff}$ and $V'_{sum}$ input 170b of comparator 170 using switch 182.

When the voltage of the ramp having waveform $V'_R$ exceeds the applied input voltage $V'$ at contact 182a, the potential at output 170c of comparator 170 changes to a true on state. This change of state increments the counter 180 which activates switch 182 to connect to the next input voltage at contact 182b to input 170b of comparator 170. Because the next input voltage still exceeds the voltage of the ramp of waveform $V'_R$ at this point in time, the potential at the output 170c of the comparator 170 returns to a false (off) state. The leading edge of the output voltage pulse $P'_1$ comprising the false ... true ... false (off ... on ... off) transitions of the voltage at comparator output 170c, and marks the time when the voltage of the ramp of waveform $V'_R$ crosses (i.e. is equal to) the input voltage $V'_{-sum}$ at contact 182b.

When the voltage of ramp $V'_R$ exceeds the applied input voltage $V_{-sum}$ at contact 182b, the potential at output 170c of comparator 170 changes to a true state (on voltage). This change of state increments the counter 80 which activates switch 182 to connect the next input voltage at contact 182c to input 170b of comparator 170. Because the next input voltage still exceeds voltage of the ramp $V'_R$ at this point in time, the potential at output 170c of the comparator 170 returns to a false (off) state. The leading edge of the output voltage pulse $P'_2$ comprising the false ... true ... false (off ... on ... off) transitions of the voltage at comparator output 170c, and marks the time when the voltage of the ramp of waveform $V'_R$ crosses (i.e. is equal to) the input voltage $V_{diff}$ at contact 182c.

When the voltage of ramp $V'_R$ exceeds the applied input voltage $V'_{diff}$ at contact 182c, the potential at output 170c of comparator 170 changes to a true state (on voltage). This change of state increments the counter 180 which activates switch 182 to connect the next input voltage at contact 182d to input 170b of comparator 170. Because the next input voltage still exceeds voltage of the ramp $V'_R$ at this point in time, the potential at output 170c of the comparator 170 returns to a false (off) state. The leading edge of the output voltage pulse $P'_3$ comprising the false ... true ... false (off ... on ... off) transitions of the voltage at comparator output 170c, and marks the time when the voltage of the ramp of waveform $V'_R$ crosses (i.e. is equal to) the input voltage $V_{sum}$ at contact 182d.

Each comparator input voltage $V'_{-sum}$, $V'_{diff}$ and $V'_{sum}$ generates a single output voltage pulse, the relative timing of which indicates the ratio of the input voltages. After the third output voltage pulse has been generated, the encoding sequence is complete. These pulses are converted to light pulses by optical source 188, and transmitted over a fiber optic cable 190 to photodetector 192 in network 122. Photodetector 192 is connected to signal conditioner 193, which is connected to microprocessor 196. The position of the upper level 133 of liquid 134 is determined in microprocessor 196, converted into volume, weight or mass of the quantity of fuel in tank 134', and displayed by display 198.

Figure 4:
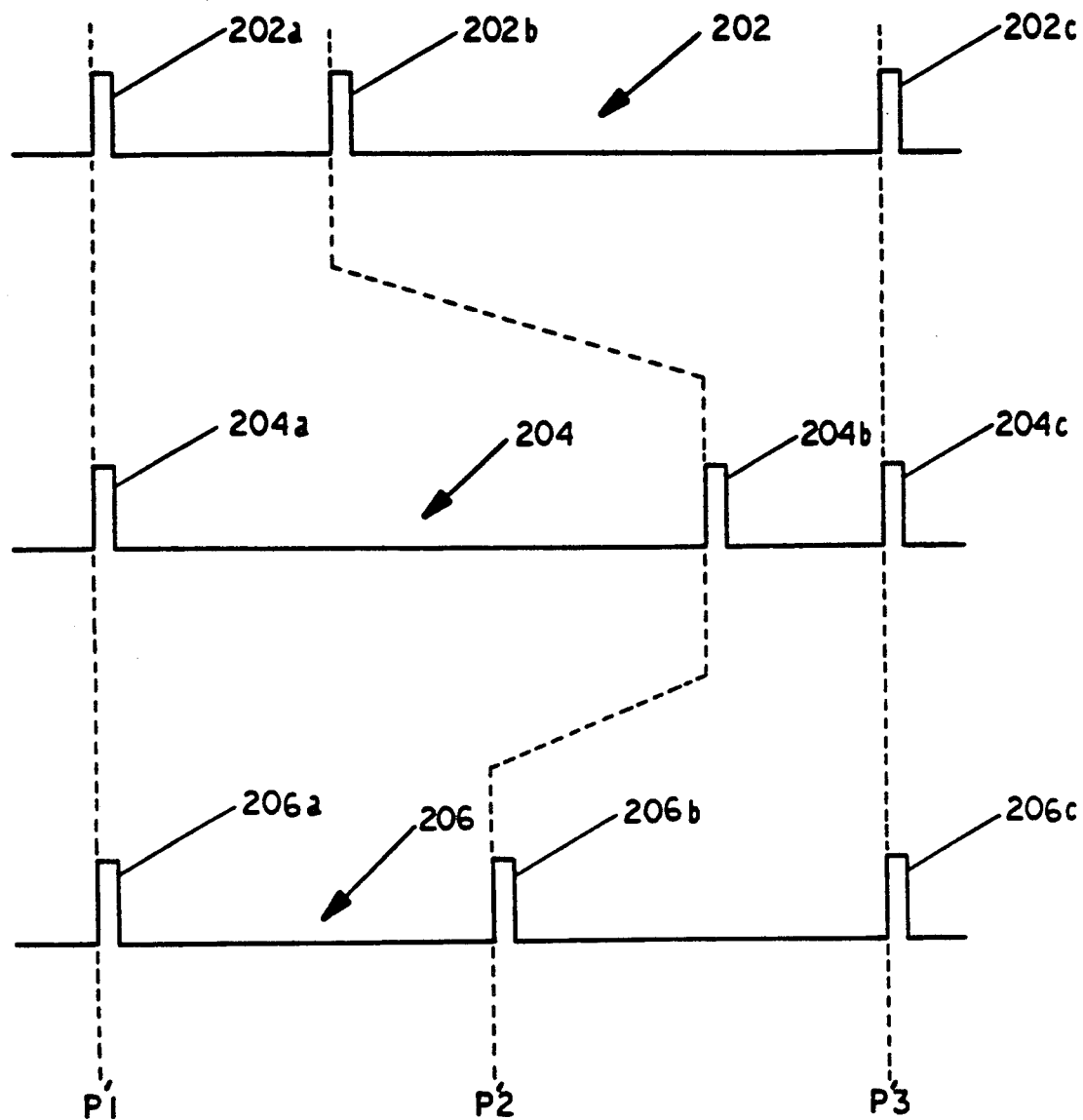
FIG. 4 shows relative positions of pulses $P'_1$, $P'_2$ and $P'_3$ on three vertically aligned traces produced by the signal processing of transducer signals for monitoring the level of liquid in a tank in accordance with the invention.

FIG. 4 shows relative positions of voltage pulses $P'_1$, $P'_2$ and $P'_3$ on vertically aligned traces 202, 204 and 206 produced by the signal processing of transducer signals for monitoring the fuel level 133 in accordance with the invention. Three different fuel levels 133 of fuel 134 are illustrated in FIG. 4 by traces 202, 204 and 206.

Trace 202 shows the position of pulses 202a, 202b and 202c (P'$_1$, P'$_2$ and P'$_3$ respectively) when the position of common plate 126 results in the capacitance of differential plate 128 being less than the capacitance of differential plate 130. Trace 204 shows the position of pulses 204a, 204b and 204c (P'$_1$, P'$_2$ and P'$_3$ respectively) when the position of common plate 126 results in the capacitance of differential plate 128 being greater than the capacitance of differential plate 130. Trace 206 shows the position of pulses 206a, 206b and 206c (P'$_1$, P'$_2$ and P'$_3$ respectively) when the position of common plate 126 results in the capacitance of differential plate 128 being equal to the capacitance of differential plate 130.

The position of the pulse P'$_3$ is unchanged relative to P'$_1$ for any level of liquid fuel 134. The position of pulse P'$_3$ corresponds to the total capacitance of the transducer 124 which is independent of the level 133 of fuel 134. The position of pulse P'$_2$ however, moves in time with respect to pulses P'$_1$ and P'$_3$, reflecting the relative linear position of the upper level 133 of fuel 134 along transducer 124.

Each signal from transducer is dubject to variation due to environmental influences, such as changes in temperature. These variations, due to environmental influences, cause incorrect indications of the quantity monitored based upon a particular signal unless it is normalized (corrected). The displayed by system 210. The upper level 233 raises and lowers with the addition and removal respectively of fuel 234 from tank 224. Capacitive transducer 228 is positioned within tank 234' so that as the upper level 233 raises and lowers the portion of capacitive transducer 228 which is in contact with fuel 234 changes. Preferably, transducer 228 in linear and is positioned so that the portion of transducer 228 which is in contact with fuel 234 changes linearly. Capacitive transducer 230 is positioned in tank 234' so that it remains completely contacted by fuel 234 as level 233 raises and lowers.

Capacitive transducer (probe) 228 preferably consists of an outer straight tube and either a contoured or straight inner tube. These tubes are insulated from each other and form a capacitor with a variable dielectric of fuel 234 and air 234". Transducer 230 is preferably a compensator, located so that it will remain filled with fuel at all positions of the upper surface 133 of liquid fuel 134 in the tank. Transducer 230 is used to compensate for variations in dielectric constant in the capacitance value read from transducer 228.

Relative to the system 210, transducer 228 preferably is a capacitive fuel probe, and transducer 230 is a compensator unit.

Voltage ramp generator 240 applies a voltage ramp having waveform V$_{ZR}$ through line 241 to capacitive transducers 228 and 230 which produce currents I$_{Z1}$ and I$_{Z2}$, in lines 242 and 244 respectively, that are converted to voltages V$_{Z1}$ and V$_{Z2}$, in transimpedance amplifiers 246 and 248 respectively. Voltages V$_{Z1}$ and V$_{Z2}$, in lines 250 and 252, are provided to voltage amplifiers 254, 256 and 258 to produce respective voltages V$^z_{-sum}$, V$^z_{diff}$ and V$^z_{sum}$, in lines 260, 262 and 264 respectively. Voltage V$^z_{-sum}$ is proportional to the distribution in time of the three pulses provides an indication of the quantity being monitored. This quantity is normalization in accordance with the present invention using the time between these pulses. For example, the fuel level 133 is determined in the microprocessor from the pulse positions in time by Equation II as follows:

$$\text{Fuel level} = k' \frac{2 T_{P2-P1} - T_{P3-P1}}{T_{P3-P1}} \quad \text{(II)}$$

K' = Proportionality constant
T$_{P2-P1}$ = Time between pulse P'2 and pulse P'1
T$_{P3-P1}$ = Time between pulse P'3 and pulse P'1

From Equation II it can be seen that the variation in the total transducer capacitance due to environmental effects will change the absolute value of the times between the pulses but not their ratios. Therefore, the sensed fuel level indication will not be affected by environmental changes in the transducer.

Figure 5:
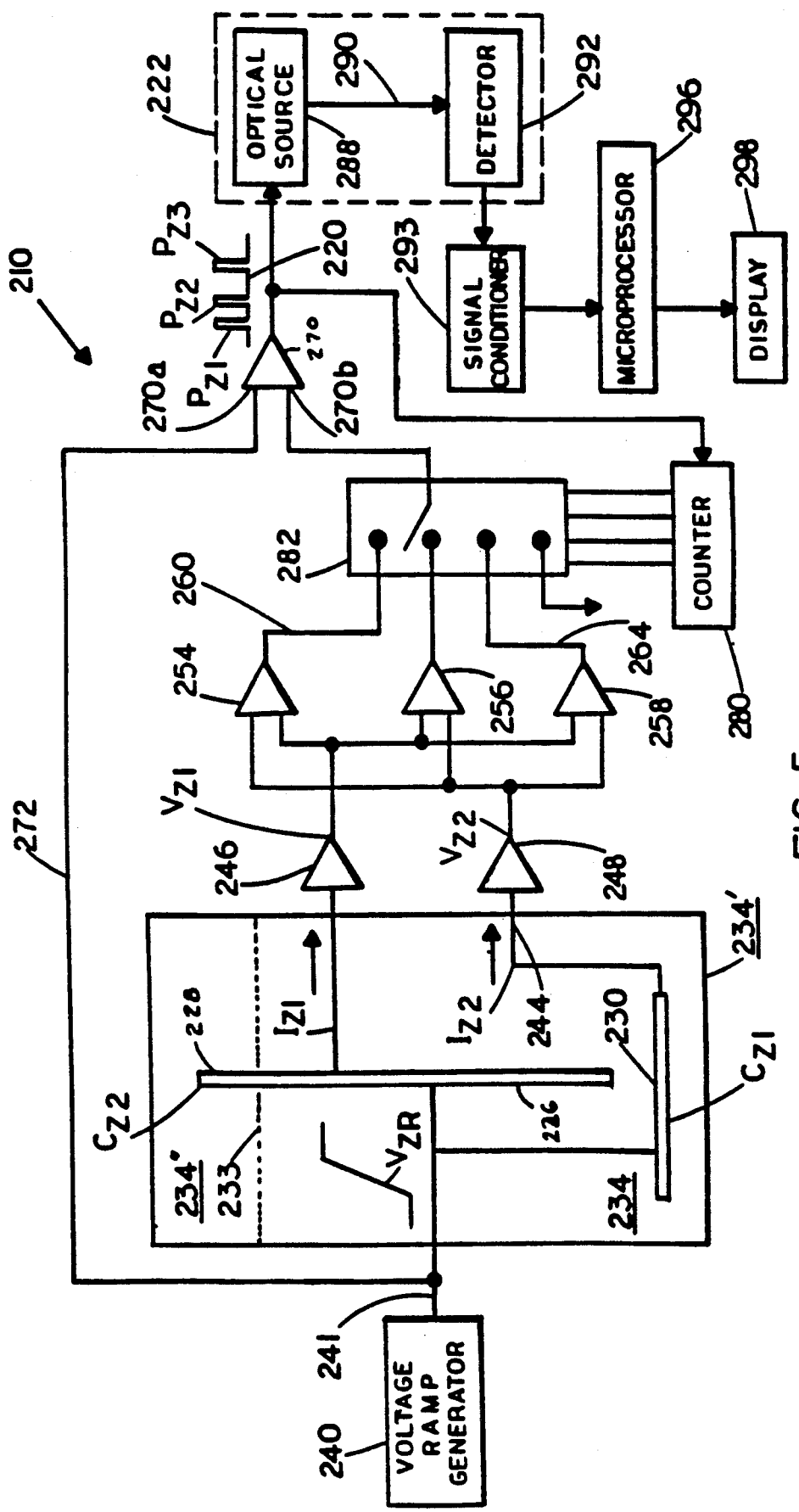
FIG. 5 shows a schematic representation of an encoder system for capacitive fuel quantity gauging in accordance with the invention.

FIG. 5 shows an electronic encoder system 210 which converts a differential capacitive transducer value into timing pulses 220 which are suitable for conversion into optical pulses and transmission over an optical network 222. Differential capacitor transducers (probes) 228 and 230 are positioned in tank 234'. The capacitive transducers 228 and 230 provide signal values C$_{Z1}$ and C$_{Z2}$ respectively.

The upper surface (level) 233 of liquid fuel 234 forms a liquid-gas (air) interface between gas (air) 234" and liquid fuel 234 in tank 234'. The position of upper surface 233 is readily determined and the quantity of fuel in tank 234' is negated sum $-(V_{Z1}+V_{Z2})$. Voltage V$^z_{diff}$ is proportional to the difference $(V_{Z1}-V_{Z2})$. Voltage V$^z_{sum}$ is proportional to the sum $(V_{Z1}+V_{Z2})$. A comparator 270 is driven by the input voltage ramp through line 272, and sequentially compares the voltages V$^z_{-sum}$, V$^z_{diff}$, and V$^z_{sum}$ with input voltage ramp. A series of three output pulses P$_{Z1}$, P$_{Z2}$ and P$_{Z3}$ are generated in which the timing of the intermediate pulse P$_{Z2}$ relative to the preceding first pulse P$_{Z1}$ and the succeeding third pulse P$_{Z3}$ presents the desired transducer value. Pulses P$_{Z1}$, P$_{Z2}$ and P$_{Z3}$ are then converted to light and transmitted over an optical network 222. The encoding system 210 normalizes the sensed value in the event that the total transducer value varies due to environmental influences. Thus, the system 210 produces a series of pulses in which the relationship of the intermediate pulse with its preceding and succeeding pulse, is representative of the transducer value, and desirably normalizes the sensed value in the event that the total transducer value varies due to environmental influences.

A voltage ramp having waveform V$_{ZR}$ is applied to the common plate 226, which charges differential capacitor plates 228 and 236 to produce current flows I$_{Z1}$ and I$_{Z2}$ through the respective sides of the differential plates 228 and 230 to produce current flows I$_{Z1}$ and I$_{Z2}$ through lines 242 and 244 respectively of the transducer 224. These currents (I$_{Z1}$ and I$_{Z2}$) are proportional to C$_{Z1}$ and C$_{Z2}$ respectively. Currents I$_{Z1}$ and I$_{Z2}$ are converted to voltages by transimpedance amplifiers 246 and 248 to produce voltages V$_{Z1}$ and V$_{Z2}$ which are proportional to C$_{Z1}$ and C$_{Z2}$ respectively. Voltages V$^z_{-sum}$, V$^z_{diff}$ and V$^z_{sum}$ are produced by voltage amplifiers 254, 256 and 258 respectively. Voltages V$^z_{-sum}$, V$^z_{diff}$ and V$^z_{sum}$ are proportional to the algebraic negated sum $[-(V_{Z1}+V_{Z2})]$, difference $[V_{Z1}-V_{Z2}]$ and sum $[V_{Z1}+V_{Z2}]$ of Voltages V$_{Z1}$ and V$_{Z2}$.

Input 270a of comparator 270 is driven through line 272 by the voltage ramp which also drives the common plate 226 of the transducer 224. A counter 280 is reset to one at the beginning of each encoding cycle, and sequentially connects voltages $V^Z_{-sum}$, $V^Z_{diff}$ and $V^Z_{sum}$ input 270b of comparator 270 using switch 282.

When the voltage of the ramp having waveform $V_{ZR}$ exceeds the applied input voltage $V_Z$ at contact 282a, the potential at output 270c of comparator 270 changes to a true on state. This change of state increments the counter 280 which activates switch 282 to connect to the next input voltage at contact 282b to input 270b of comparator 270. Because the next input voltage still exceeds the voltage of the ramp of waveform $V_{ZR}$ at this point in time, the potential at the output 270c of the comparator 270 returns to a false (off) state. The leading edge of the output voltage pulse $P_{Z1}$ comprising the false ... true ... false (off ... on ... off) transitions of the voltage at comparator output 270c, and marks the time when the voltage of the ramp of waveform $V_{ZR}$ crosses (i.e. is equal to) the input voltage $V^Z_{-sum}$ at contact 282b.

When the voltage of ramp $V_{ZR}$ exceeds the applied input voltage $V^Z_{-sum}$ at contact 282b, the potential at output 270c of comparator 270 changes to a true state (on voltage). This change of state increments the counter 80 which activates switch 282 to connect the next input voltage at contact 282c to input 270b of comparator 270. Because the next input voltage still exceeds voltage of the ramp $V_{ZR}$ at this point in time, the potential at output 270c of the comparator 270 returns to a false (off) state. The leading edge of the output voltage pulse $P_{Z2}$ comprising the false ... true ... false (off ... on ... off) transitions of the voltage at comparator output 270c, and marks the time when the voltage of the ramp of waveform $V_{ZR}$ crosses (i.e. is equal to) the input voltage $V^Z_{diff}$ at contact 282c.

When the voltage of ramp $V_{ZR}$ exceeds the applied input voltage $V^Z_{diff}$ at contact 282c, the potential at output 270c of comparator 270 changes to a true state (on voltage). This change of state increments the counter 280 which activates switch 282 to connect the next input voltage at contact 182d to input 270b of comparator 270. Because the next input voltage still exceeds voltage of the ramp $V_{ZR}$ at this point in time, the potential at output 270c of the comparator 270 returns to a false (off) state. The leading edge of the output voltage pulse $P_{Z3}$ comprising the false ... true ... false (off ... on ... off) transitions of the voltage at comparator output 270c, and marks the time when the voltage of the ramp of waveform $V_{ZR}$ crosses (i.e. is equal to) the input voltage $V^Z_{sum}$ at contact 282d.

Each comparator input voltage $V^Z_{-sum}$, $V^Z_{diff}$ and $V^Z_{sum}$ generates a single output voltage pulse, the relative timing of which indicates the ratio of the input voltages. After the third output voltage pulse has been generated, the encoding sequence is complete. These pulses are converted to light pulses by optical source 288, and transmitted over a fiber optic cable 290 to photodetector 292 in network 222. Photodetector 292 is connected to signal conditioner 293, which is connected to microprocessor 296. The position of the upper level 233 of liquid 234 is determined in microprocessor 296, converted into volume, weight or mass of the quantity of fuel in tank 234', and displayed by display 298.

Figure 6:
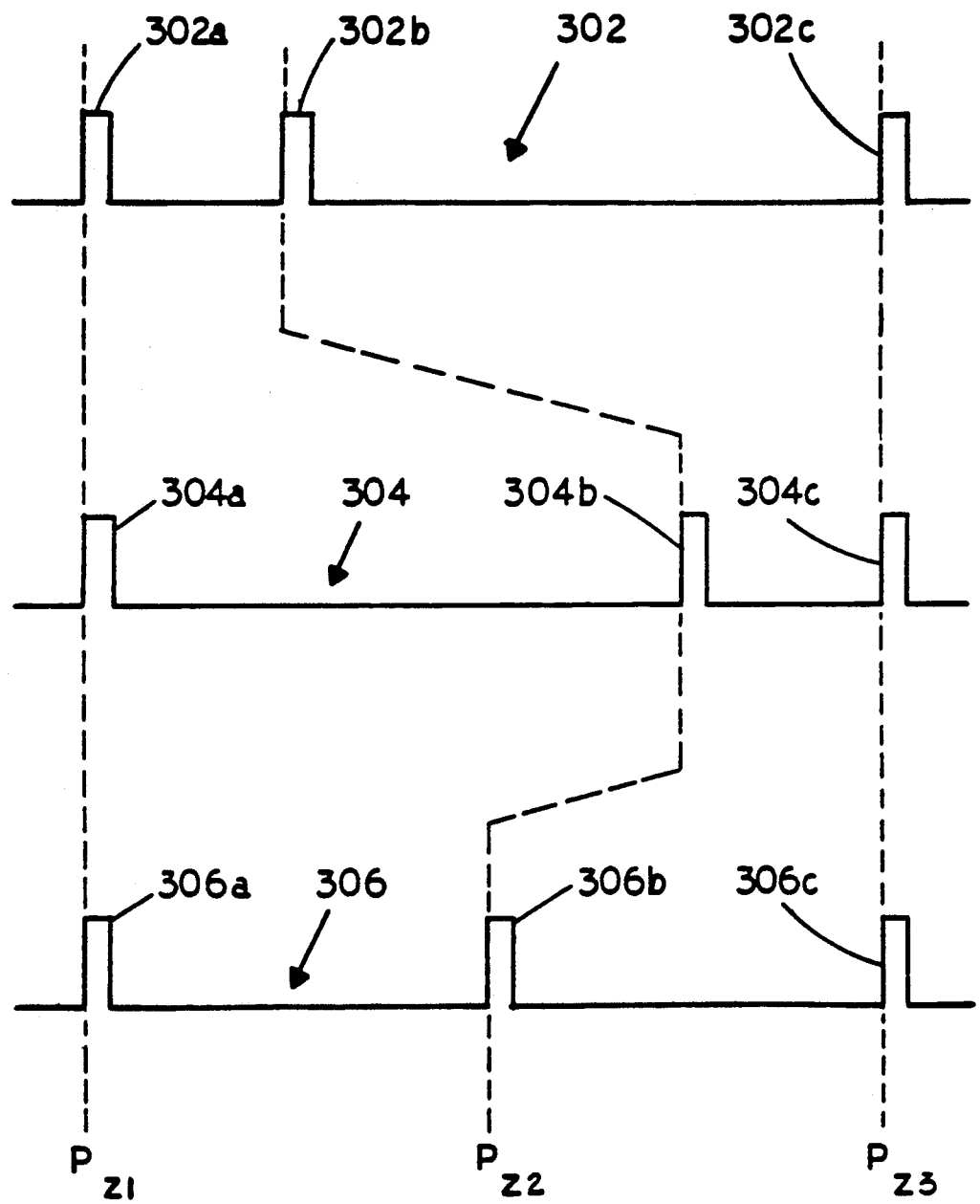
FIG. 6 shows relative positions of pulses $P_{Z1}$, $P_{Z2}$ and $P_{Z3}$ on three vertically aligned traces produced by the signal processing of transducer signals for monitoring the level of liquid in a tank in accordance with the invention.

FIG. 6 shows relative positions of voltage pulses $P_{Z1}$, $P_{Z2}$ and $P_{Z3}$ on vertically aligned traces 302, 304 and 306 produced by the signal processing of transducer signals for monitoring the fuel level 233 in accordance with the invention. Three different fuel levels 233 of fuel 234 are illustrated in FIG. 4 by traces 302, 304 and 306.

Trace 302 shows the position of pulses 302a, 302b and 302c ($P_{Z1}$, $P_{Z2}$ and $P_{Z3}$ respectively) when the position of common plate 226 results in the capacitance of differential plate 228 being less than the capacitance of differential plate 230. Trace 304 shows the position of pulses 304a, 304b and 304c ($P_{Z1}$, $P_{Z2}$ and $P_{Z3}$ respectively) when the position of common plate 226 results in the capacitance of differential plate 228 being greater than the capacitance of differential plate 230. Trace 306 shows the position of pulses 306a, 306b and 306c ($P_{Z1}$, $P_{Z2}$ and $P_{Z3}$ respectively) when the position of common plate 226 results in the capacitance of differential plate 228 being equal to the capacitance of differential plate 230.

The position of the pulse $P_{Z3}$ is unchanged relative to $P_{Z1}$ for any level of liquid fuel 334. The position of pulse $P_{Z3}$ corresponds to the total capacitance of the transducer 224 which is independent of the level 233 of fuel 234. The position of pulse $P_{Z2}$ however, moves in time with respect to pulses $P_{Z1}$ and $P_{Z3}$, reflecting the relative linear position of the upper level 233 of fuel 234 along transducer 224.

Each signal from transducer is subject to variation due to environmental influences, such as changes in temperature. These variations, due to environmental influences, cause incorrect indications of the quantity monitored based upon a particular signal unless it is normalized (corrected). The distribution in time of the three pulses provides an indication of the quantity being monitored. This quantity is normalization in accordance with the present invention using the time between these pulses. For example, the fuel level 233 is determined in the microprocessor from the pulse positions in time by Equation II as follows:

$$\text{Fuel level} = k^z \frac{2\ T_{PZ2-PZ1} - T_{PZ3-PZ1}}{T_{PZ3-PZ1}} \quad \text{(III)}$$

$k^z$ = Proportionality constant
$T_{PZ2\text{-}PZ1}$ = Time between pulse Z 2 and pulse Z 1
$T_{PZ3\text{-}PZ1}$ = Time between pulse Z 3 and pulse Z 1

From Equation III it can be seen that the variation in the total transducer capacitance due to environmental effects will change the absolute value of the times between the pulses but not their ratios. Therefore, the sensed fuel level indication will not be affected by environmental changes in the transducer.

The foregoing description and accompanying drawings are intended being illustrative of preferred embodiments of the invention, and not as limiting the invention. It is to be understood that modifications and changes may be made in the embodiments disclosed herein without departing from the spirit and scope of the invention as expressed in the appended claims.

What is claimed is:

1. A transducer system comprising a
first transducer,
switch means,
a comparator, and
an optical source,
said first transducer being adapted to measure displacement, said first transducer and said optical source being connected to said comparator, said switch means being connected to said comparator and being adapted to be sequentially operated to produce first, second and third pulses, the time relationships of said second pulse to said first and third pulses being representative of a displacement being measured by said transducer.

2. The system of claim 1 wherein said time relationships are the differences in time between said first pulse and said second pulse, between said first pulse and said third pulse, and between said second pulse and said third pulse.

3. The system of claim 1 wherein said transducer comprises a readily rotatable plate.

4. The system of claim 1 wherein said optical source is connected to an optical fiber.

5. The system of claim 4 wherein said optical fiber is connected to an optical detector.

6. The system of claim 5 wherein said optical detector is connected to a display.

7. The system of claim 1 further comprising a voltage ramp generator, said voltage ramp generator being connected to said comparator.

8. The system of claim 7 further comprising a counter, said counter being connected to said comparator.

9. The system of claim 8 further comprising a switch, said switch being connected to said counter and to said comparator.

10. The system of claim 9 wherein said transducer further comprises a first transimpedance amplifier and a second transimpedance amplifier, said first and second transimpedance amplifiers being connected to said comparator.

11. The system of claim 10 wherein said transducer further comprises a first voltage amplifier, a second voltage amplifier and a third voltage amplifier, said first, second and third voltage amplifiers being connected to said first and second transimpedance amplifiers, and to said switch.

12. The system of claim 1 wherein said transducer means comprises a capacitor.

13. The system of claim 1 further comprising a second capacitive transducer, said second transducer being connected to said comparator.

14. A displacement measuring system, comprising:
a variable capacitor,
a ramp generator,
signal processing means, and
an optical source,
said capacitor being connected to said generator and to said signal processing means, said signal processing means being connected to said optical source,
said variable capacitor having a movable planar plate and a first and a second fixed planar plate, said movable plate being adapted to be displaced in a plane parallel to the planes of said fixed plates adjacent to said fixed plates at a substantially constant lateral distance from said fixed plates,
said generator being adapted to generate a substantially linear ramp,
said signal processing means being adapted to produce a first and a second pulse, said first and said second pulses being displaced in time in proportion to the displacement of said movable plate.

15. The system of claim 14 wherein said ramp generation is a voltage ramp generator, and said pulses are voltage pulses.

16. The system of claim 14 further comprising a fuel tank.

17. The system of claim 14 further comprising a readily rotatable shaft, said shaft being connected to said movable plate.

18. The system of claim 14 further comprising a linearly movable arm, said arm being connected to said movable plate.

19. The method of claim 14 wherein said optical source is connected to an optical fiber.

20. The method of claim 19 wherein said optical fiber is connected to an optical detector.

21. The method of claim 20 wherein said detector is connected to a display.

* * * * *